Feb. 6, 1923.
R. J. ZANONE.
SCALE.
FILED JULY 7, 1921.
1,444,019
5 SHEETS-SHEET 2
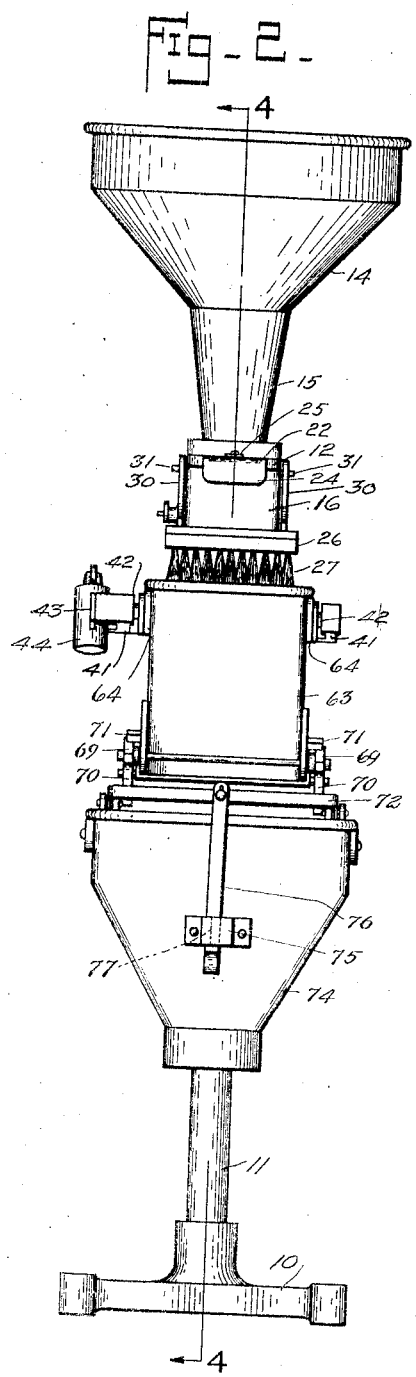
Fig-2-
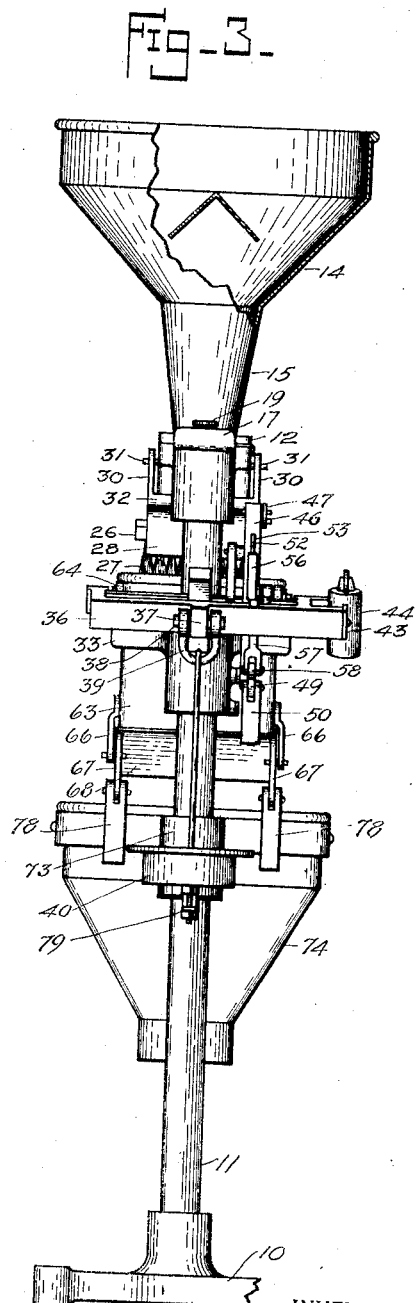
Fig-3-
INVENTOR.
Richard J Zanone
BY
ATTORNEY.

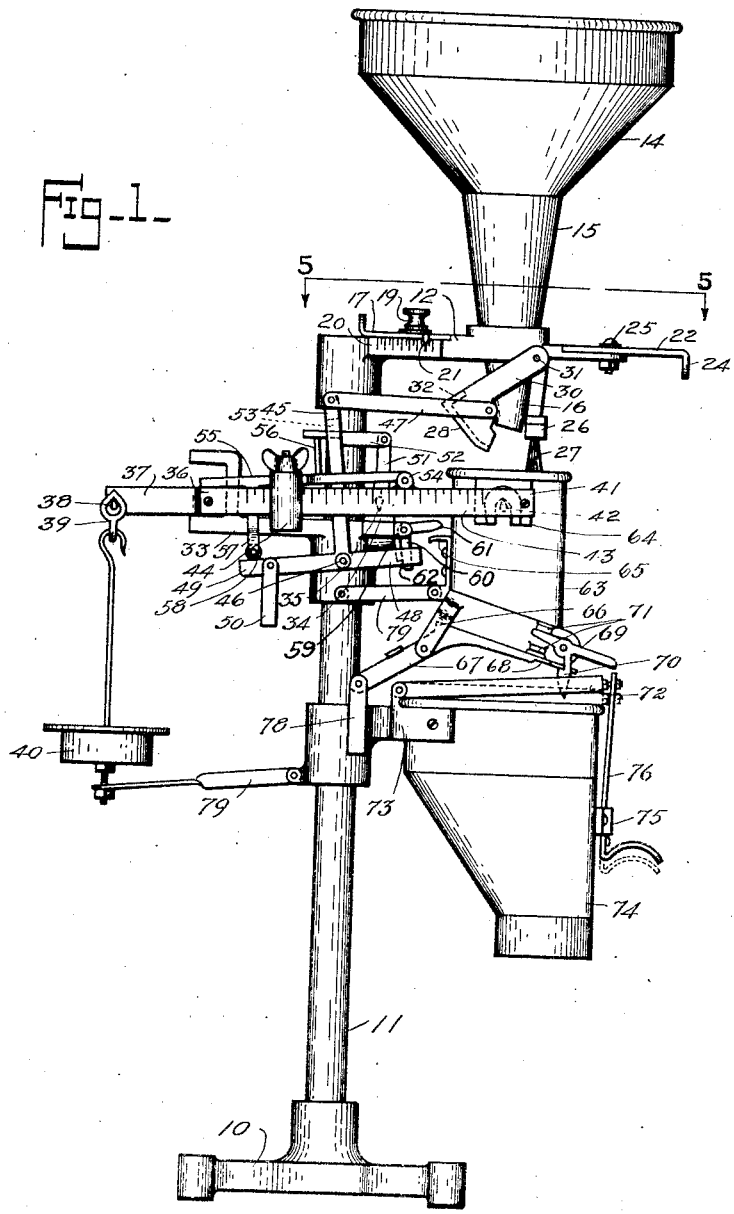

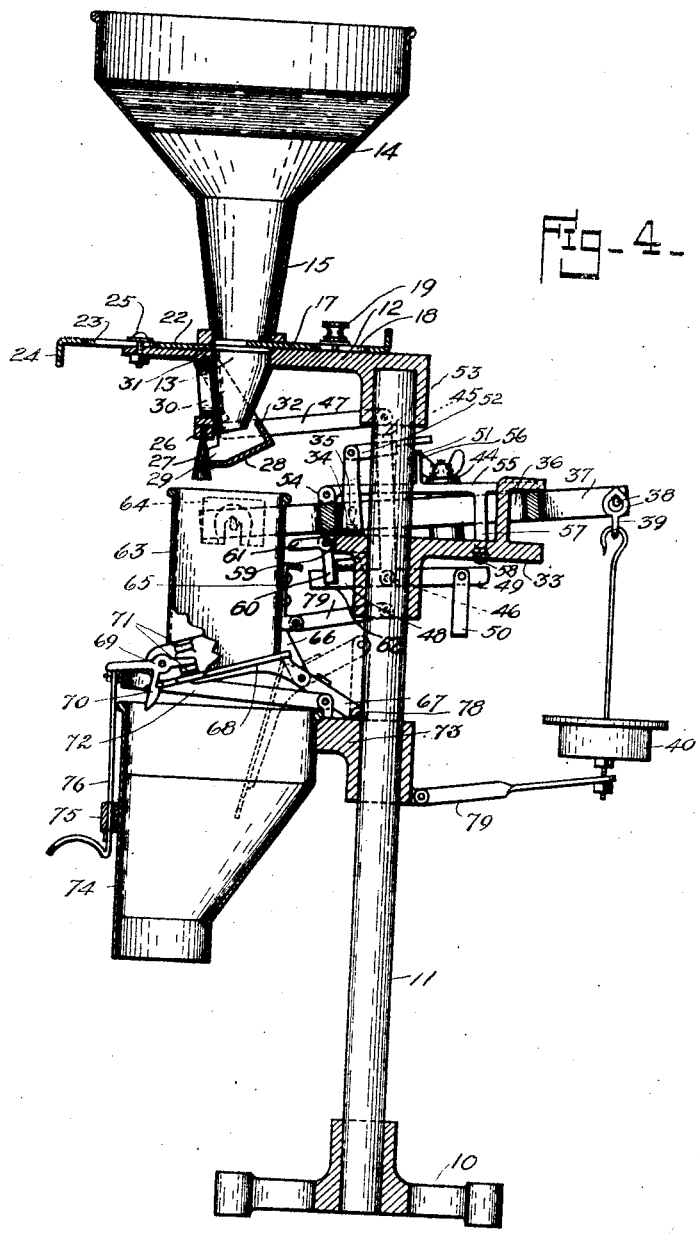
Fig-4-

Feb. 6, 1923.
R. J. ZANONE.
SCALE.
FILED JULY 7, 1921.
1,444,019
5 SHEETS-SHEET 4
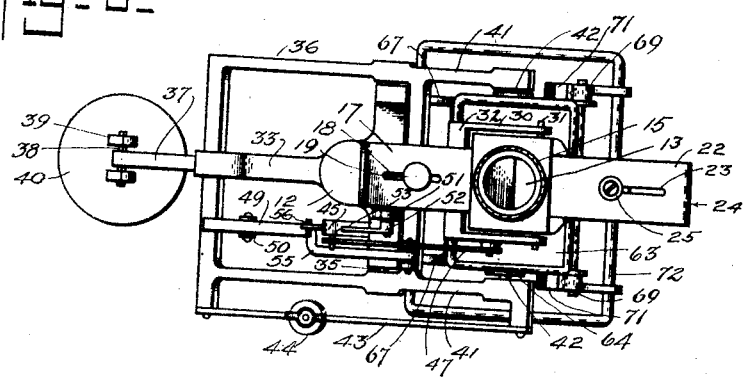
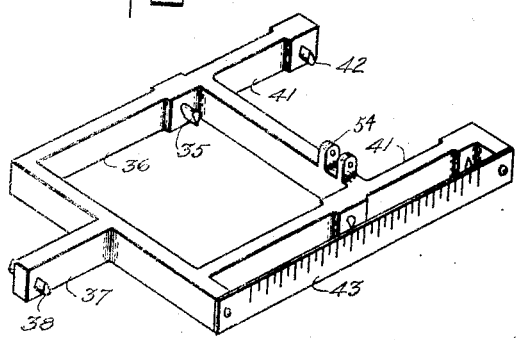
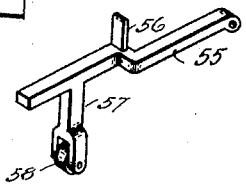
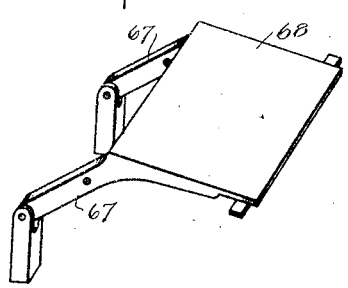
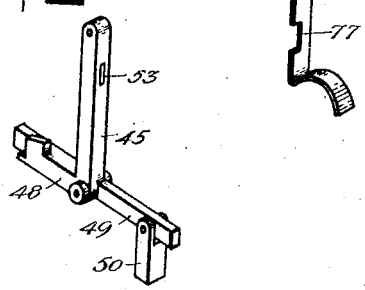
INVENTOR
Richard J. Zanone
BY
Clarkson
ATTORNEY Feb. 6, 1923.

R. J. ZANONE.
SCALE.
FILED JULY 7, 1921.

INVENTOR
Richard J. Zanone
BY
Clarkson
ATTORNEY

Patented Feb. 6, 1923.

1,444,019

UNITED STATES PATENT OFFICE.

RICHARD J. ZANONE, OF NEW ALBANY, INDIANA.

SCALE.

Application filed July 7, 1921. Serial No. 483,031.

*To all whom it may concern:*

Be it known that I, RICHARD J. ZANONE, a citizen of the United States of America, residing at New Albany, in the county of Floyd and State of Indiana, have invented certain new and useful Improvements in Scales, of which the following is a specification.

This invention relates to scales for weighing material and has special reference to an automatic dumping scale arranged to weigh and deliver a predetermined quantity of any suitable commodity such as powders, seeds, material in lumps, small articles such as nails or tacks and other like forms of matter.

One important object of the invention is to improve and simplify the general construction of devices of this character.

A second important object of the invention is to provide an improved form of feed gate control mechanism for use in such devices.

A third important object of the invention is to provide an improved form of gate control for the gate of a weighing hopper in such a device.

A fourth important object of the invention is the provision of improved means for holding the feed gate closed until all material in the weighing hopper has been delivered and the weighing hopper gate closed.

A fifth important object of the invention is to provide improved means for ensuring the closing of the feed hopper gate when the required amount of material has been delivered to the weighing hopper.

A sixth important object of the invention is to provide an improved construction ensuring the proper closing of the feed hopper gate prior to the opening of the weighing hopper gate.

A seventh important object of the invention is the provision of an improved form of gate for the feed hopper of such device.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a side elevation of one form of an automatic weighing scale constructed in accordance with this invention.

Figure 2 is a front elevation thereof.

Figure 3 is a rear elevation thereof, or portion of the feed hopper being broken away to show the spreader arrangement inside said feed hopper.

Figure 4 is a vertical median section on the line IV—IV of Figure 2.

Figure 5 is a horizontal section on the line V—V of Figure 1.

Figure 6 is a perspective view of the beam frame.

Figure 7 is a perspective view of the weighing hopper gate or door.

Figure 8 is a perspective view of a certain trip lever used in this invention.

Figure 9 is a perspective view of a lifting lever for the hopper feed gate of the device.

Figure 10 is a perspective view of a trip rod for controlling the opening of the weighing hopper gate of the invention.

Figure 11:
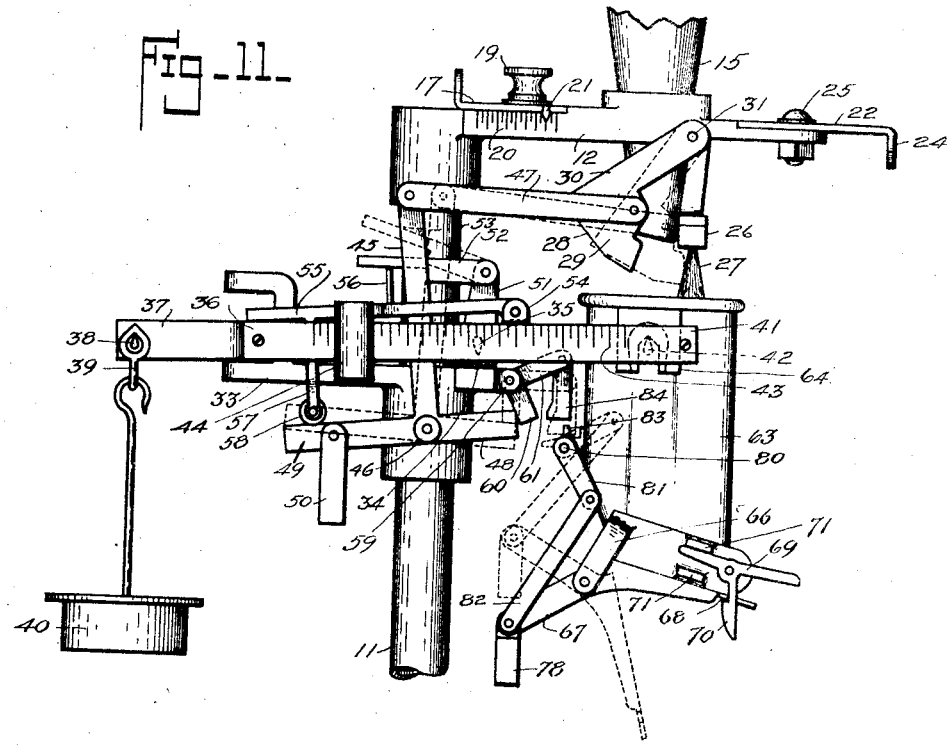
Figure 11 is a side elevation of a portion of a modified form of the device, the parts being shown in the position assumed when the weighing hopper is empty in full lines and at the instant of dumping the weighing hopper in dotted lines.

In carrying out the objects of the invention there is provided a base 10 carrying a vertical standard or support 11. On the upper end of this standard is mounted an arm 12 having a suitable opening 13 intermediate its ends. On this arm is supported a feed hopper 14 having a neck or funnel portion 15 communicating with the opening 13. This feed hopper is continued below the arm in a nozzle or delivery chute 16. Mounted on the arm 12 and extending through a suitable opening in the rear of the funnel 15 is a feed adjusting gate 17 having a longitudinal slot 18 through which passes the shank of a thumb screw 19. By means of this gate the effective area of the funnel may be regulated so that the material in the hopper may be delivered at any desired rate, the thumb screw serving to hold the gate in its adjusted position. On the side of the arm 12 is a graduated scale 20 and the gate is provided with an index or pointer 21 traversing this scale so that the required adjustment may be effected or the gate reset to a previously used position without difficulty. At the front of the machine is a cutoff gate 22 which passes through an opening in the front of the funnel 15 and is provided with a slot 23 and finger grip 24. Through the slot 23 and the arm 12 passes a bolt 25 so that the gate 22 is limited in movement and cannot be accidentally disengaged from the machine. The lower end of the nozzle 16 is closed in a peculiar manner. Across the front of the nozzle extends a bar 26 from which depends a series of tufts 27 of bristles or the like so that this part of the closure, which may be termed the gate abutment, affords a multiplicity of independently yieldable elements against which may engage the forward edge of a gate 28 having sides 29 prolonged to form hangers 30 pivoted to the arm 12 forward of the funnel as at 31. The gate is also provided with a rear wall 32 to prevent the escape of material in that direction. This yieldable gate abutment ensures that the gate will assume its proper position when closed even if material from the hopper is caught between part of the gate and the abutment as the latter will yield locally allowing such parts of the gate as are not in engagement with the caught material to close on said abutment.

Supported on the standard 11 is a frame 33 carrying fulcrum seats 34 whereon rest the fulcra 35 of a substantially rectangular beam frame 36 having a rearwardly extending arm 37 provided with fulcra 38 on which is hung the link or clevis 39. In this clevis is engaged the hook of a weight receiving counterpoise 40. Arms 41 extend forwardly from the frame 36 and carry fulcra 42 at their forward ends. On the side of the frame 36 and one of the arms 41 is carried a scale 43 whereon is slidably mounted a poise 44, these parts being of usual construction and use.

Pivoted on the frame 33 is a lifting lever for the gate 28. This lever is of inverted T-shape which has one arm 45 extending upward from the pivot 46 and having its upper end connected by a link 47 with the gate 28. The lifting lever also has a forwardly extending arm 48 and a rearwardly extending arm 49 carrying a counterpoise 50. Extending upward from the frame 33 is a latch support 51 whereto is pivoted the forward end of a gate lifting lever latch 52 which passes through an opening 53 in the arm 45, the rear end of the latch being reduced to form a shoulder which, when the upper end of the arm 45 is in forward position and the gate 28 open engages the forward face of said arm 45 and prevents the gate shutting until the latch is released. Pivoted to ears 54 on the frame 36 is the forward end of a latch trip lever or arm 55 having an upstanding finger 56 engaging beneath the lifting lever latch 52 to raise the same and thus permit the arm 45 to swing forward. The rear end of this lever normally rests on the rear cross-bar of the frame 36 and depending from the lever adjacent said rear end is a finger 57 carrying at its lower end a roller 58 which normally rests on the arm 49.

On the frame 33 are ears 59 between which is mounted an L-shaped latch member having a depending arm 60 and a forwardly extending arm 61. This member is preferably termed the lower latch lever and its depending arm 60 is arranged to move over and engage a shoulder 62 formed on the arm 48 whenever the arm 45 is tilted forwardly. When so engaged the arm 45 is locked in its forward position thus locking the gate 28 in closed position.

At 63 is a weighing hopper which has on its sides saddles 64 resting on the fulcra 42 whereby it is suspended from the frame 36. On this hopper is a trip 65 located beneath the arm 61 against which it engages as the hopper 63 rises. Lugs 66 extend downwardly and rearwardly from the hopper and to these lugs is pivotally connected a pair of arms 67 carrying a weighing hopper gate 68 which normally closes the inclined lower end of the hopper 63. This gate is normally held closed by T-shaped latches 69 each pivoted to a side of the hopper and having the stem of the T formed as a bevel ended hook 70. One arm of the T extends rearwardly of the pivot and oscillates between limit stops 71 while the other arm extends forwardly across a U-shaped frame 72 which has its legs extending rearwardly and pivoted to a bracket 73 mounted on the standard 11. This bracket supports a delivery funnel 74 into which the feed hopper discharges and on the front of the funnel is a guide loop 75 wherethrough extends a trip controlling rod 76 pivoted to the cross bar of the U-shaped frame 72 so that the latter may be raised or lowered at will. The rod 76 is provided with a notch 77 so that the rod when lifted may be swung sidewise to cause a side of the loop 75 to enter the notch and thus hold the rod raised.

In the operation of this form of the device, which is that illustrated in Figures 1 to 10 inclusive, let it be supposed that the feed hopper is full, the gate 22 closed and the gate 17 properly adjusted. The gate 22 is opened after the poise 44 has been adjusted or the counter poise properly weighted. The parts will now be in the position shown in Figure 1. When the weight of material for which the machine is adjusted has flowed into the weighing hopper the latter will overcome the balance of the frame 36 and the front of the frame will tilt downward. As the frame tilts the finger 56 lifts the latch 52 which permits the arm 45 to swing forward and the gate 28 to close, this being effected by the weight of said gate. As the arm 45 swings forward the arm 48 drops and the latch arm 60 engages on the shoulder 62 thus locking the gate 28 in closed position. Up to this time the gate 68 has remained closed. Continuation of the downward movement of the weighing hopper brings the forwardly extending arms of the latches 69 into engagement with the U-frame 72 thus releasing the latches and permitting the door 68 to drop under the influence of the weight of the material in the hopper. The charge of material thus passes into the delivery funnel under which may be placed any suitable receptacle such as a bag or box. As soon as relieved of the material the weighing hopper starts upward releasing the latches 69 from the U-frame 72. Simultaneously the counterpoise 78 on one of the arms 67 closes the gate 68. After the gate is closed and the hopper ascends the trip 65 engages the latch arm 61 and lifts it thus releasing the arm 60 and permitting the arm 45 to tilt backward and open the gate 28. The backward tilting of said arm is effected by the engagement of the roller 58 on the arm 49, which causes said arm to support sufficient of the weight of the lever 55 to overcome the tendency of the gate 28 to close. As the lever 55 drops the latch 52 also drops and, upon completion of the opening of the gate 28, engages the arm 45 to again lock the gate open. The operation will be repeated until the hopper 14 is emptied or the gate 22 closed.

It will be noted that the counterpoise 40 and weighing hopper 63 are steadied in their movements by links 79.

Figure 12:
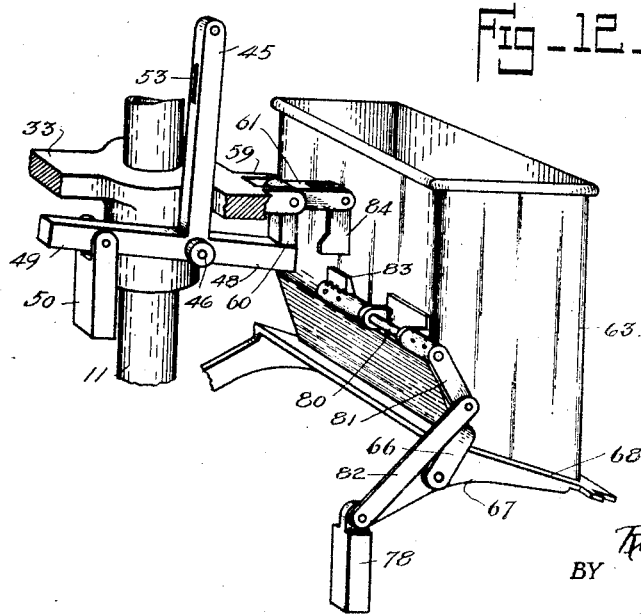
Figure 12 is a perspective view showing certain of the parts illustrated in Figure 11.

In the modification shown in Figures 11 and 12 a slight change in the means for locking the gate 28 closed and releasing it at the proper time is disclosed. In this modification there is mounted on the rear of the weighing hopper a rock shaft 80 whereon is fixed a rock arm 81 connected by a link 82 with one of the gate supporting arms 67 so that movement of the gate 68 rotates the shaft. On the shaft is also mounted a finger 83 engageable, when in vertical position with a swinging dog 84 suspended from the arm 61. This finger is in vertical position only when the gate 68 is closed so that until this closing is effected the arm 60 holds the gate 28 closed.

There has thus been provided a simple and efficient device of the kind described and for the purpose specified.

It is obvious that minor changes may be made in the form and construction of the invention without departing from the material principles thereof. It is not therefore desired to confine the invention to the exact form herein shown and described, but it is wished to include all such as properly come within the scope claimed.

Having thus described the invention, what is claimed as new, is:—

1. In an automatic weighing machine, a feed hopper, a feed hopper gate, a pivoted lever, a link connecting said lever and gate, a latch arranged to engage said lever with the gate in open position to lock the lever against movement permitting the gate to close, a tiltable balance beam, a weighing hopper carried by one end of the beam, and means carried by the balance beam and arranged to move the latch to release position upon tilting of the beam in one direction.

2. In an automatic weighing machine, a feed hopper, a feed hopper gate, a lever having a vertical arm and a horizontally extending arm, said lever being pivoted between its ends, a link connecting the vertical arm and gate, a latch engaging the vertical arm when the gate is open to lock said arm in open gate position, a tilting beam, a weighing hopper carried by said beam and movable therewith, a trip arm having one end pivoted to the beam and its free end lying loosely on the beam, an upwardly extending finger on the last mentioned arm arranged to engage and lift the latch to release the vertical lever arm upon tilting of the beam in one direction, and a second finger on said trip arm arranged to engage the horizontal lever arm upon tilting of the beam in the opposite direction and thereby move the lever to open the gate.

3. In an automatic weighing machine, a feed hopper, a feed hopper gate, a pivoted lever, a link connecting said lever and gate, a latch arranged to engage said lever with the gate in open position to lock the lever against movement permitting the gate to close, a tiltable balance beam, a weighing hopper carried by one end of the beam, means carried by the balance beam and arranged to move the latch to release position upon tilting of the beam in one direction, a second latch arranged to lock the lever in closed gate position, and a trip on the weighing hopper arranged to engage and release the latch upon tilting of the beam in the other direction.

4. In an automatic weighing machine, a feed hopper, a feed hopper gate, a lever having a vertical arm and a horizontally extending arm, said lever being pivoted between its ends, a link connecting the vertical arm and gate, a latch engaging the vertical arm when the gate is open to lock said arm in open gate position, a tilting beam, a weighing hopper carried by said beam and movable therewith, a trip arm having one end pivoted to the beam and its free end lying loosely on the beam, an upwardly extending finger on the last mentioned arm arranged to engage and lift the latch to release the vertical lever arm upon tilting of the beam in one direction, a second finger on said trip arm arranged to engage the horizontal lever arm upon tilting of the beam in the opposite direction and thereby move the lever to open the gate, a second latch arranged to lock the lever in closed gate position, and a trip on the weighing hopper arranged to engage and release the latch upon tilting of the beam in the other direction.

5. In an automatic weighing machine, a feed hopper, a feed hopper gate, a lever of inverted T-shape and having its stem extending upwardly and its arms extending forwardly and rearwardly respectively, a link connecting said stem and gate, a latch engageable with the stem when the gate is open whereby to restrain the gate from closing, a tiltable weigh beam fulcrumed intermediate its ends, a weighing hopper carried by one end of the beam and movable vertically therewith, a trip arm pivoted at one end to the beam adjacent its forward end, the free end of said trip arm normally lying loosely on the rear portion of the beam, a trip finger projecting upward from the trip arm to the rear of the beam fulcrum and engaging the latch to lift the same to release position, a second finger projecting downward from the trip arm to engage the rearwardly extending arm of the lever, a second latch engaging the forwardly extending arm of the lever when the gate is closed to lock the lever in closed gate position, and a trip means on the weighing hopper engageable with the second latch to release the same upon upward movement of the weighing hopper.

6. In an automatic weighing machine, a feed hopper, a feed hopper gate, a lever of inverted T-shape and having its stem extending upwardly and its arm extending forwardly and rearwardly respectively, a link connecting said stem and gate, a latch engageable with the stem when the gate is open whereby to restrain the gate from closing, a tiltable weigh beam fulcrumed intermediate its ends, a weighing hopper carried by one end of the beam and movable vertically therewith, a trip arm pivoted at one end to the beam adjacent its forward end, the free end of said trip arm normally lying loosely on the rear portion of the beam, a trip finger projecting upward from the trip arm to the rear of the beam fulcrum and engaging the latch to lift the same to release position, a second finger projecting downward from trip arm to engage the rearwardly extending arm of the lever, a second latch engaging the forwardly extending arm of the lever when the gate is closed to lock the lever in closed gate position, a trip means on the weighing hopper engageable with the second latch to release the same upon upward movement of the weighing hopper, a weighing hopper gate, and a connection between the trip means on the hopper and the gate arranged to move the trip means to inoperative position whenever the weighing hopper gate is open.

7. In an automatic weighing machine, a feed hopper, a feed hopper gate, a lever of inverted T-shape and having its stem extending upwardly and its arms extending forwardly and rearwardly respectively, a link connecting said stem and gate, a latch engageable with the stem when the gate is open whereby to restrain the gate from closing, a tiltable weigh beam fulcrumed intermediate its ends, a weighing hopper carried by one end of the beam and movable vertically therewith, a trip arm pivoted at one end to the beam adjacent its forward end, the free end of said trip arm normally lying loosely on the rear portion of the beam, a trip finger projecting upward from the trip arm to the rear of the beam fulcrum and engaging the latch to lift the same to release position, a second finger projecting downward from the trip arm to engage the rearwardly extending arm of the lever, an L-shaped latch pivoted at its angle above the forwardly extending lever arm and having a depending latch arm arranged to engage over the forwardly extending lever arm when the latter is depressed and the feed hopper gate closed, the remaining arm of said latch extending towards the weighing hopper, and a trip means on the weighing hopper engageable with the last mentioned latch arm to move the vertical latch arm off the lever arm upon upward movement of the weighing hopper.

8. In an automatic weighing machine, a feed hopper, a feed hopper gate, a lever of inverted T-shape and having its stem extending upwardly and its arms extending forwardly and rearwardly respectively, a link connecting said stem and gate, a latch engageable with the stem when the gate is open whereby to restrain the gate from closing, a tiltable weigh beam fulcrumed intermediate its ends, a weighing hopper carried by one end of the beam and movable vertically therewith, a trip arm pivoted at one end to the beam adjacent its forward end, the free end of said trip arm normally lying loosely on the rear portion of the beam, a trip finger projecting upward from the trip arm to the rear of the beam fulcrum and engaging the latch to lift the same to release position, a second finger projecting downward from the trip arm to engage the rearwardly extending arm of the lever, an L-shaped latch pivoted at its angle above the forwardly extending lever arm and having a depending latch arm arranged to engage over the forwardly extending lever arm when the latter is depressed and the feed hopper gate closed, the remaining arm of said latch extending towards the weighing hopper, a trip means on the weighing hopper engageable with the last mentioned latch arm to move the vertical latch arm off the lever arm upon upward movement of the weighing hopper, a weighing hopper gate, a connection between the trip means on the hopper and the gate arranged to move the trip means to inoperative position whenever the weighing hopper gate is open.

9. In an automatic weighing machine, a feed hopper, a feed hopper gate, a lever of inverted T-shape and having its stem extending upwardly and its arms extending forwardly and rearwardly respectively, a link connecting said stem and gate, a latch engageable with the stem when the gate is open whereby to restrain the gate from closing, a tiltable weigh beam fulcrumed intermediate its ends, a weighing hopper carried by one end of the beam and movable vertically therewith, a trip arm pivoted at one end to the beam adjacent its forward end, the free end of said trip arm normally lying loosely on the rear portion of the beam, a trip finger projecting upward from the trip arm to the rear of the beam fulcrum and engaging the latch to lift the same to release position, a second finger projecting downward from the trip arm to engage the rearwardly extending arm of the lever, a second latch engaging the forwardly extending arm of the lever when the gate is closed to lock the lever in closed gate position, a trip means on the weighing hopper engageable with the second latch to release the same upon upward movement of the weighing hopper, a weighing hopper gate pivoted at its rear to the weighing hopper and having a rearwardly extending arm, a rock shaft journalled on the rear of the weighing hopper, a rock arm on said shaft, a link connecting the rock arm and the rearwardly extending gate arm, and a finger fixed on the rock shaft and rotating therewith between vertical and horizontal positions, said finger being arranged to engage and release the second latch when in vertical position.

10. In an automatic weighing machine, a feed hopper, a feed hopper gate, a lever of inverted T-shape and having its stem extending upwardly and its arms extending forwardly and rearwardly respectively, a link connecting said stem and gate, a latch engageable with the stem when the gate is open whereby to restrain the gate from closing, a tiltable weigh beam fulcrumed intermediate its ends, a weighing hopper carried by one end of the beam and movable vertically therewith, a trip arm pivoted at one end to the beam adjacent its forward end, the free end of said trip arm normally lying loosely on the rear portion of the beam, a trip finger projecting upward from the trip arm to the rear of the beam fulcrum and engaging the latch to lift the same to release position, a second finger projecting downward from the trip arm to engage the rearwardly extending arm of the lever, a weighing hopper gate pivoted at its rear to the weighing hopper and having a rearwardly extending arm, a rock shaft journalled on the rear of the weighing hopper, a rock arm on said shaft, a link connecting the rock arm and the rearwardly extending gate arm, a dog pivoted at its upper end to the last mentioned latch arm to swing loosely beneath the same, and a finger fixed on the rock shaft and oscillating therewith between vertical and horizontal positions, said finger being arranged to engage and lift the dog and its arm when the finger is vertical and after weighing the hopper moves upward whereby to move the depending latch arm off the forwardly extending lever arm and release the lever to permit movement thereof to open gate position.

In testimony whereof I affix my signature.

RICHARD J. ZANONE.